United States Patent [19]

Arnould et al.

[11] 4,038,809
[45] Aug. 2, 1977

[54] CROP GATHERING APPARATUS FOR GRAIN CROP HARVESTERS

[75] Inventors: Jean Arnould, Paris; James B. McNaught, St. Germain-en-Laye; Jose Andiano, Morsang, all of France

[73] Assignee: Massey-Ferguson Services N.V., Curacao, Netherlands Antilles

[21] Appl. No.: 641,706

[22] Filed: Dec. 17, 1975

[30] Foreign Application Priority Data

Dec. 20, 1974 United Kingdom ............. 55246/74

[51] Int. Cl.² .......................................... A01D 41/06
[52] U.S. Cl. ..................................... 56/124; 56/14.6
[58] Field of Search ................... 56/14.1–14.6, 56/158, 124; 130/27 R; 198/129, 184, 196, 202, 208

[56] References Cited

U.S. PATENT DOCUMENTS

| | | | |
|---|---|---|---|
| 1,707,998 | 4/1929 | Shaw | 198/191 |
| 2,470,704 | 5/1949 | Korsmo et al. | 56/124 |
| 2,979,187 | 4/1961 | Erickson | 198/184 |
| 3,575,274 | 4/1971 | Ewing et al. | 198/191 |
| 3,718,197 | 2/1973 | Barten et al. | 198/202 X |
| 3,981,391 | 9/1976 | Phillips et al. | 198/202 |

FOREIGN PATENT DOCUMENTS 1,301,844  1/1973  United Kingdom ............. 56/14.6

*Primary Examiner*—Russell R. Kinsey
*Attorney, Agent, or Firm*—Robert L. Farris

[57] ABSTRACT

Crop gathering table for a grain combine has belts positioned to convey crop rearwards between a cutterbar and an auger. Each belt is caused to run straight by adjustable guide rollers located between the upper and lower runs of the belt and engaging the edge portions of the inner surface of the belt in its lower run and deflecting said edge portions downwards. The guide rollers are angularly adjustable by a lever mechanism actuable from the front of the table while the belts are being driven.

5 Claims, 9 Drawing Figures

CROP GATHERING APPARATUS FOR GRAIN CROP HARVESTERS

This invention relates to crop gathering apparatus and in particular to such apparatus comprising a table to receive cut crop, said table defining the gathering width of the crop gathering apparatus, attachment means on the table whereby the table may be mounted on a harvesting vehicle and a crop conveying belt mounted on the table and positioned in the gathering width of the table.

It has been proposed to provide crop gathering apparatus in which endless crop conveying belts or canvasses have been provided with transverse wooden slats fastened to their crop conveying surface. These wooden slats have served two purposes. Firstly, they have provided crop conveying formations to assist the belts in carrying the crop by reducing slippage of the crop relative to the belts. Secondly they have served to guide the belts to reduce the inherent tendency of the belts not to run straight but to run off the rollers around which they are trained. This latter function of the slats has been achieved by providing a fixed vertical guide surface against which the ends of the slats run.

However crop conveying belts as described in the preceding paragraph have not been entirely satisfactory, particularly as regards the use of the slats to guide the belts and it is an aim of the present invention to provide improvements in this respect.

Belt guidance techniques applicable to conventional belt conveyor systems are not readily applicable to crop conveying belts in grain crop gathering apparatus due to the design parameters imposed by the crop and the gathering apparatus itself. Examples of such parameters are the desirability of a flat crop conveying surface and stringent limitations on available space.

An embodiment of the invention will now be described by way of example with reference to the accompanying drawings in which.

Figure 1:
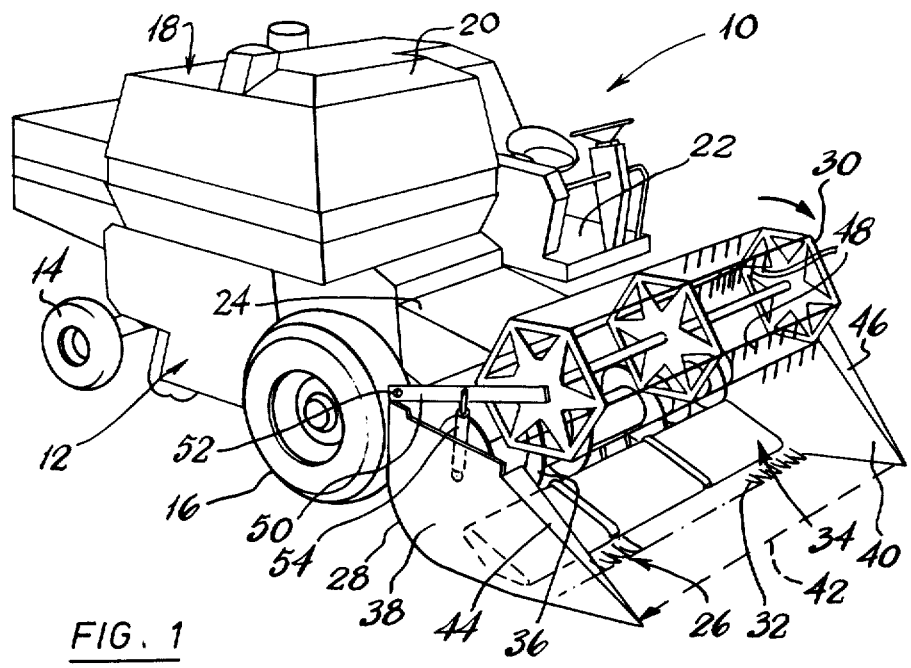
FIG. 1 shows a perspective view of a grain crop harvester referred-to hereafter as a combine.

As shown in FIG. 1 a combine 10 comprises a main body 12 mounted on steerable rear wheels 14 and driven front wheels 16 and constituting a harvesting vehicle. The main body houses an engine at 18 and conventional grain crop threshing and separating apparatus (not shown) such as a threshing cylinder and concave, straw walkers and a shaker shoe. The main body also provides a grain tank 20 and an operator's platform 22.

Mounted at the front of main body 12 on the housing 24 of a conventional chain and slat elevator 25 is crop gathering apparatus 26. The crop gathering apparatus comprises a table 28 to receive cut crop, a reel 30, crop cutting means in the form of a cutterbar 32, crop conveying apparatus 34 and an auger 36. Elevator housing 24 is pivotally mounted at its rear end in the usual manner and hydraulic rams (not shown) are provided to raise and lower its forward end. The forward end of the housing has conventional attachment means (not shown) whereby table 28 is mounted thereon so as to be quickly detachable.

Table 28 has end walls 38, 40 defining the crop gathering width 42 of the table, and each end wall has a forwardly sloping front edge providing crop dividers 44, 46.

Reel 30 is of conventional construction, having tines 48 and a mechanism (not shown) for maintaining the tines in a downwardly projecting attitude as the reel rotates. The reel is mounted on support arms 50 which are pivotally connected to the table at 52 whereby the reel can be raised and lowered by means of hydraulic rams 54 in the usual manner. Reel 30 can also be adjusted in the fore and aft direction along support arms 50 in the usual manner.

Cutterbar 32 is of conventional form and comprises a reciprocable knife 56 having a serrated sharpened cutting edge 58, knife guides 60 and forwardly-projecting fingers 62. Knife 56 is reciprocated by a conventional knife drive (not shown).

Figure 2:
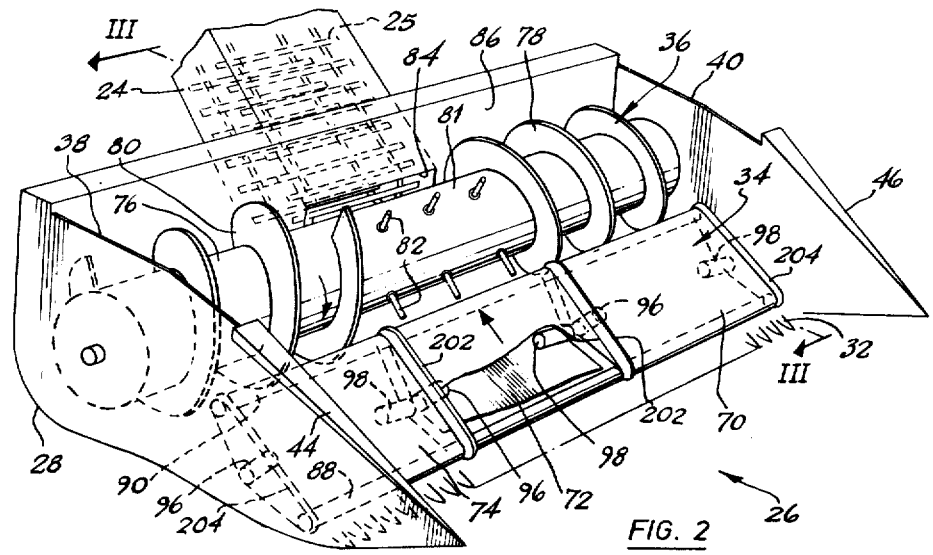
FIG. 2 shows a perspective view of a crop gathering table of the combine of FIG. 1.

As shown in FIG. 2, crop conveying apparatus 34 comprises three crop conveying belts 70, 72 and 74 arranged side by side across the crop gathering width 42 of table 28.

Auger 36 comprises a central shaft in the form of a sheet metal tube 76 and two helical flights 78, 80 mounted on the tube at opposite ends thereof. Flights 78, 80 are of opposite hand and spaced apart by a central portion 81 of the tube from which a series of crop feeding fingers 82 project. The fingers extend, feather and retract in the usual way as the auger rotates, to feed crop to elevator 25 through a rectangular opening 84 formed in the rear wall 86 of table 28 just below the main table support beam 87.

The three crop conveying belts 70, 72, 74 are each trained round a pair of spaced-apart end rollers 88, 90 and have an upper run 92 and a lower run 94. Each end roller extends across the full width of table 28. Drive means in the form of a chain and sprocket drive (not shown) connected to rear roller 90 is provided so as to drive the upper runs of the belts rearwards as indicated by arrow D in FIG. 3.

Belt guide means is provided for each of the belts 70, 72, 74 so as to maintain each belt in its correct position along the length of rollers 88, 90 i.e. to centralize each belt to ensure that it runs straight and does not move sideways.

The belt guide means comprises a pair of position-adjustable guide rollers 96, 98 for each belt. Each roller is positioned in the region of one edge of its belt and between the upper and lower runs of the belt for rolling contact with the upper or inner surface 100 of the belt in lower run 94.

Figures 5, 6:
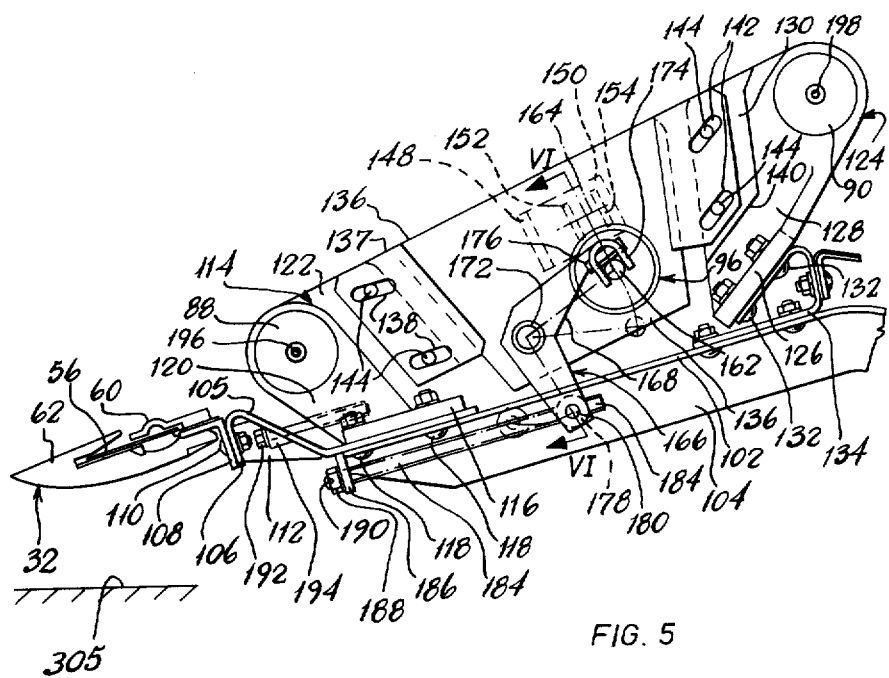
FIG. 5 shows a section taken along line V—V in FIGS. 2 and 4 showing belt guide means and apparatus for adjusting said belt guide means.
FIG. 6 shows a section on the line VI—VI in FIG. 5.

FIGS. 5 and 6 show the structure whereby guide rollers 96, 98 and end rollers 88, 90 are supported and adjusted.

As shown in FIG. 5, table 28 has a floor 102 and a series of skids 104 engageable with the ground 305 are secured to the lower surface of the floor. The skids also serve to stiffen the table.

The forward end of floor 102 has secured thereto an extension piece 105 having a downwardly extending flange 106 on which cutterbar 32 is supported by means of a right angle section member 108 and a series of bolts 110. Flange 106 is stiffened by a series of welded-in webs 112.

The front end roller 88 is journalled on four bearing members 114, one in each of the two gaps between central belt 72 and the two side belts 70 and 74, and one at each end of the roller. Each bearing member 114 is in the form of a casting having a base flange 116 formed with slots through which bolts 118 extend whereby the bearing member is secured to the floor 102 of table 28 so as to be position-adjustable in the fore/aft direction.

A body portion 120 projects upwardly from the base flange 116 of each bearing member 114 to support through bearings (not shown) the front end roller 88. A rearwardly projecting vertical support flange 122 is formed integrally with body portion 120.

The rear end roller 90 is mounted in a manner closely analogous to that of front end roller 88. Four bearing members 124 each have a base flange 126 a body portion 128 and a vertical support flange 130. The base flange is formed with slots and is thereby adjustably secured by bolts 132 to a bracket 134 secured to the table floor 102.

A vertical roller support member or plate 136 having a forward end portion 137 formed with slots 138 and a rearward end portion 140 formed with slots 142 is itself supported between the vertical flanges 122 and 130 by bolts 144 extending through the slots.

Roller support plate 136 has welded to its opposite sides one end of each of two cantilever members in the form of roller support arms 146, 148 extending into the gap between the upper and lower runs 92 and 94 respectively of the crop conveying belt. The other end of each arm 146, 148 carries an end plate 150 from which two apertured lugs 152, 154 project. The two roller support plates 136 adjacent to the end walls 38 and 40 of the table 28 each have one cantilevered roller support arm extending toward the center of the table. The roller support plate 136 adjacent the end wall 38 has a cantilevered roller support arm 148 attached. The roller support plate 136 adjacent the end wall 40 has a cantilevered support arm 146 attached.

Each guide roller 96, 98 comprises a cylindrical sleeve 156 journalled through internal ball races 158, 160 on a shaft 162. The roller is mounted for angular adjustment with respect to the crop conveying belt. For this purpose one end of each shaft 162 is mounted between lugs 152 and 154 for pivotal movement about an axis 164.

A lever mechanism 166 is mounted on each roller support plate 136 and positioned to act on the other end of each of the shafts 162. The lever mechanisms are actuable to effect angular adjustment of the shafts and their rollers.

Each lever mechanism 166 comprises first and second lever members in the form of bell cranks 168, 170 pivotally mounted on a common pivot member 172 carried by and projecting laterally of roller support plate 136.

The upper end of each bell crank 168, 170 carries an inverted U-section member 174 to receive its respective roller shaft 162. A cylindrical contact member 176 extends through the U-section member to make contact with the end of the shaft 162 and to apply downward thrust thereto.

The lower end of each bell crank 168, 170 is bifurcated and an adjustment member 178 is pivotally mounted therein by trunnions 180. The adjustment member has a screwthreaded aperture 182 in which a complementary screwthreaded rod 184 is received. Rod 184 extends through an apertured bracket 186 projecting downwards from the floor 102 of table 28 and has a castellated nut 188 and associated split pin 190 to enable it to be rotated by a spanner.

To enable front roller 88 to be aligned precisely, an adjustment bolt 192 is provided for each front bearing member 114 to enable the bearing member to be pulled forwards. Each adjustment bolt engages at its rear end a screwthreaded bore in its bearing member and at its forward end extends through and bears against an apertured shoulder 194 welded to extension piece 105.

Figure 3:
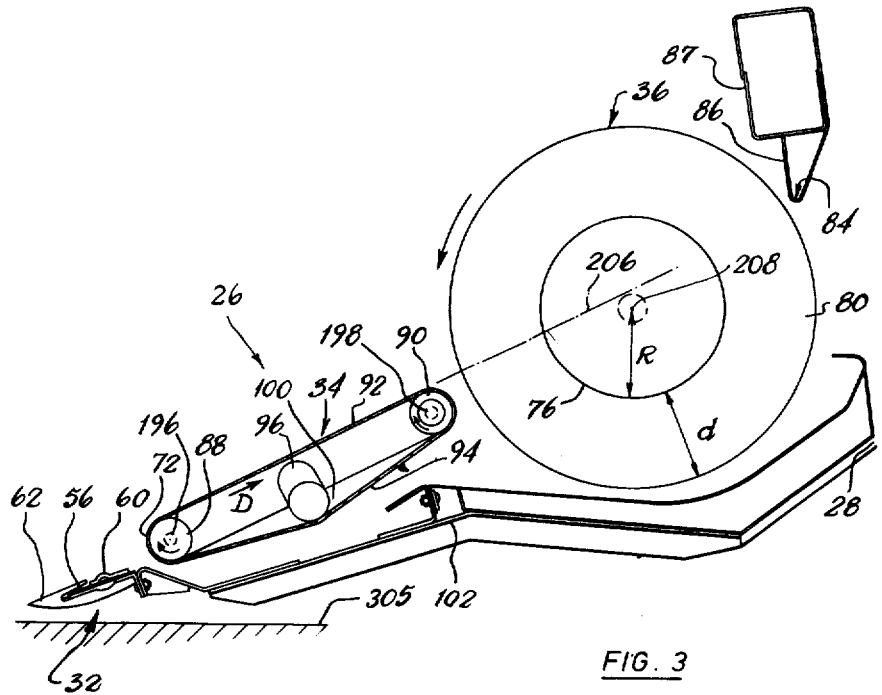
FIG. 3 shows a section taken along line III—III in FIG. 2.

As illustrated in FIG. 3, the guide rollers 96, 98 present to the surface 100 of the belts 70, 72, 74, a surface inclined with respect to the axes of rotation 196, 198 of end rollers 88, 90 respectively, (the said axes being parallel to the upper surface of the upper run 92 of each belt) so as to cause the outer or edge portions of the belt in the lower run to adopt a corresponding inclination as they pass over the guide rollers.

Figure 4:
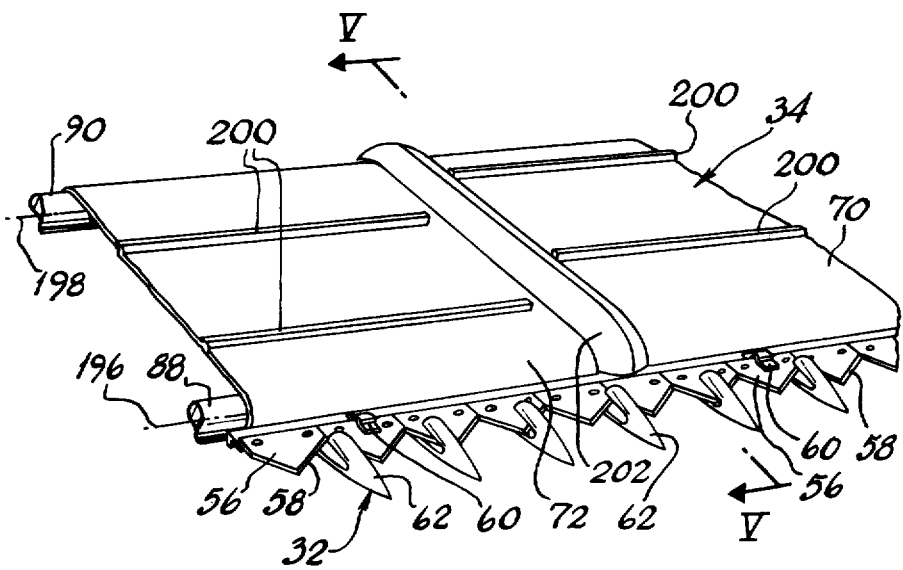
FIG. 4 shows an enlarged perspective cut-away view of a portion of the table of FIG. 2.

As shown in FIG. 4, crop conveying formations in the form of transverse ribs 200 are provided on the outer surface of the belts. The belts themselves are formed of natural or synthetic rubber having one or more layers (not shown) of woven textile material embedded therein. The ribs 200 are of rubber and are bonded to the belt in any suitable manner.

Guide rollers 96, 98 are all mounted in the manner illustrated in FIGS. 5 and 6 and the two spaces between the belts 70, 72, 74 are as shown in FIGS. 2 and 4 covered over by a pair of sheet metal strips 202 (not shown in FIGS. 5 and 6) which are profiled so as to cause crop falling thereon, to slide off onto one of the belts. Similar strips 204 are provided adjacent the table end walls 38, 40.

As illustrated in FIG. 3 the flights 78 and 80 of auger 36 are deeper than is usual for a conventional combine table. The depth d of the flights is approximately equal to the radius R of tube 76. Furthermore the crop conveyor belts 70, 72, 74 are positioned in relation to the auger so that their upper runs 92 all extend in a direction (identified in FIG. 3 by chain dot line 206) which passes above or intersects the axis of rotation 208 of the auger. In use, crop cut by cutterbar 32 falls onto belts 70, 72, 74. Reel 30 is rotated at a speed such that the linear rearward speed of each tine 48 at the bottom portion of its circle of rotation, is slightly greater than the forward ground speed of the combine - whereby the reel causes the crop to fall head first onto the crop conveyor 34.

Belts 70, 72, 74 are driven at a speed such that in their upper runs 92 their net forward speed with respect to the ground is almost zero. The belts feed the crop - whether short or long - to auger 36 in a uniform layer and the crop passes under the auger tube 76 and is conveyed to elevator 25.

Guide rollers 96, 98 ensure that the belts 70, 72, 74 run straight by causing a portion of their lower runs 94 to adopt a troughed configuration. Each roller 96 or 98, by deflecting its belt, tends to move the belt away from the roller. With the rollers at each edge of the belt deflecting it by an equal amount, the belt experiences no net deflecting force in either direction. By making small changes in the inclination of roller 96 or 98 any inherent tendency of the belt to run to one side or the other (due for example to slight imperfections in the alignment of end rollers 88, 90 or other factors) can easily be compensated-for, so that the belt runs straight.

The method of adjusting guide rollers 96, 98 is extremely simple. The table is raised by the table lift rams and the drive to the belts 70, 72 and 74 is engaged. Close observation of the belts enables any tendency of the belts to move laterally to be quickly identified. To correct such a tendency the roller at the edge of the belt towards which the belt is moving is caused to press downwards a little harder on the belt by engaging a spanner with nut 188 on threaded rod 184 and rotating the rod until the bolt is seen to run straight. Bolts 192 should not need adjustment once roller 88 has been initially set (which would be done at the factory or at a dealer's premises).

Figure 7:
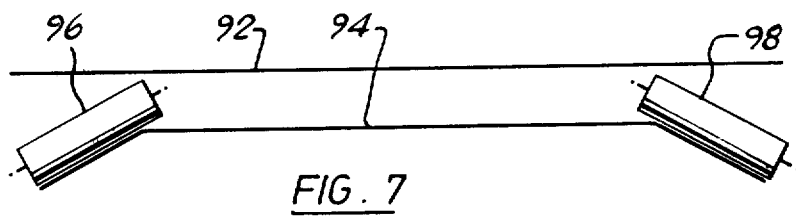
FIG. 7 is a diagrammatic illustration of one of the conveyor belts and the cylindrical guide rollers of FIGS. 2, 3, 5 and 6.
Figure 8:
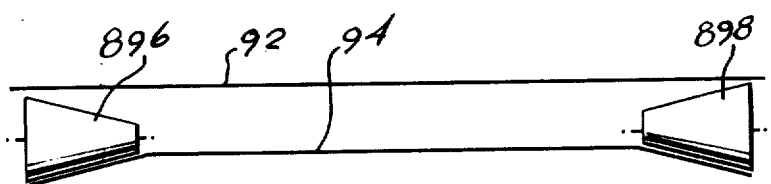
FIG. 8 is a diagrammatic illustration of one of the conveyor belts and frusto-conical guide rollers.
Figure 9:
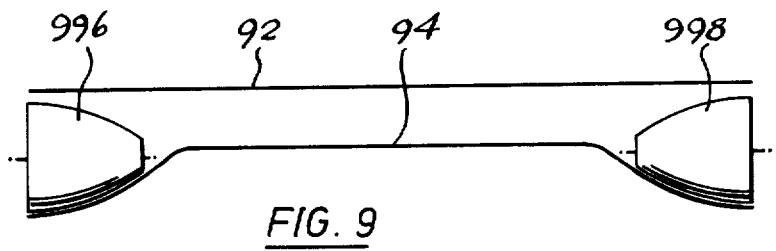
FIG. 9 is a diagrammatic illustration of one of the conveyor belts and tapered guide rollers with a rounded profile.

FIGS. 7 to 9 illustrate various possible arrangements of the guide rollers 96, 98. FIGS. 7, 8 and 9 show the guide rollers deflecting the edge portions of the belt downwards. FIG. 7 shows cylindrical rollers whereas FIG. 8 shows frusto-conical rollers 896,898 tapering towards the notional centre line of the belt. FIG. 9 shows tappering rollers 996,998 with a somewhat rounded profile.

The advantages provided by the embodiment of the invention described above with reference to FIGS. 1 to 6 of the drawings include the following:

1. efficient head first feeding of cut crop into the body of the combine for threshing, regardless of crop length;

2. smooth flow of crop from crop conveyor 34 to auger 36 and onwards to elevator 25 - due to the spacial relationship of the conveyor and the auger;

3. the belts of crop conveyor 34 can be adjusted to run straight without the use of fixed guides - thereby avoiding the high friction and short service life characteristics of previously known drapers;

4. the provision of compact and easily adjustable mountings for the belt guide rollers;

5. the provision of a belt guidance system which allows both the upper runs 92 of the belts to be flat across their whole crop conveying area and which allows the use of crop conveying formations such as the transverse ribs 200 on the outer surface of each belt.

It is to be understood that the invention is not necessarily limited by the details of the embodiments described above, and in particular:

1. the invention is applicable to pick-up type drapers i.e. to combines wherein no cutterbar is provided and fingers are provided on the draper to pick-up a windrowed crop;

2. the crop cutting means need not be a conventional cutterbar;

3. the belts 70, 72 74 could be replaced by canvas type conveyor bands and the term "belt" as used in the claims is intended to cover all types of endless band conveyor;

4. more than one guide roller could be provided at each belt edge if desired.

5. the use of a reel may not be needed;

6. rollers 96, 98 could be replaced by some other means providing rolling contact with the crop conveying belt e.g. an endless guide belt trained round guide means therefor;

7. the rollers 96, 98 could be mounted for adjustment otherwise than by way of purely angular adjustment. For example the rollers or at least one of them could be position adjustable bodily towards and away from the centre-line of its crop conveying belt.

We claim:

1. A crop gathering table for a combine harvester including a table frame, an auger trough mounted on the rear portion of the frame and extending the length of the table, a rear table wall extending upwardly from the rear portion of the auger trough, an end wall mounted on each end of the frame and connected to the auger trough and each end of the rear table wall, an auger rotatably journaled on the end walls and extending from one end wall to the other end wall above the auger trough, drive means to drive the auger to convey material from each end of the table to the center, an aperture in the center portion of the rear table wall, conveyor means on the center portion of the auger for feeding crop material through the aperture in the center portion of the rear table wall, a reciprocating knife mounted on the front portion of the table frame and extending from one end wall to the other end wall, and a conveyor belt mechanism mounted on the table frame between the reciprocating knife and the auger for conveying crop material from the knife to the auger, the conveyor belt mechanism including at least two roller support members attached to the table frame, a rear end roller rotatably journaled on the rear portion of the roller support members, a front end roller rotatably journaled on the forward portion of the roller support members, at least one conveyor belt trained around the front end roller and the rear end roller with an upper crop material conveying run and a lower return run, and a pair of guide rollers attached to an adjustable mounting structure on the roller support members between the upper and lower runs of the conveyor belt with one guide roller engaging the upper surface of each free edge of the lower run of the conveyor belt, the adjustable mounting structure for each guide roller includes a guide roller support shaft with one end pivotally attached to a frame member attached to at least one of the roller support members and adjusting means attached to one of the roller support members and to the other end of the guide roller support shaft to move the other end of the guide roller support shaft generally up and down and thereby adjust the downward deflection of the outer edge of the lower run of the conveyor belt.

2. The crop gathering table of claim 1 wherein the frame member, to which one end of the guide roller support shaft is pivotally attached, is a cantilevered member extending from one of the roller support members into the gap between the upper material conveying run and the lower return run of the conveyor belt.

3. The crop gathering table of claim 1 wherein the adjusting means includes a bell-crank pivotally attached to a roller support member with one arm attached to a roller support member and another arm connected to the table frame by an adjustment screw.

4. The crop gathering table of claim 2 wherein the adjusting means includes a bell-crank pivotally attached to a roller support member with one arm attached to a roller support member and another arm connected to the table frame by an adjustment screw.

5. The crop gathering table of claim 1 wherein the conveyor belt mechanism includes a plurality of conveyor belts with a roller support member and a guide roller at each end of each belt.

* * * * *